United States Patent [19]

Nissen et al.

[11] 4,309,215
[45] Jan. 5, 1982

[54] METHOD FOR THE CEMENTATION OF METALS

[75] Inventors: Reinhard Nissen; Rupprecht Graf, both of Cologne, Fed. Rep. of Germany

[73] Assignee: Klöckner-Humboldt-Deutz AG, Fed. Rep. of Germany

[21] Appl. No.: 89,625

[22] Filed: Oct. 29, 1979

Related U.S. Application Data

[63] Continuation-in-part of Ser. No. 18,018, Mar. 6, 1979, abandoned.

[30] Foreign Application Priority Data

Mar. 6, 1978 [DE] Fed. Rep. of Germany ....... 2809535

[51] Int. Cl.$^3$ .............................................. C22B 15/12
[52] U.S. Cl. ...................................... 75/109; 75/117; 75/119; 75/121
[58] Field of Search .................. 75/109, 117, 119, 121

[56] References Cited

U.S. PATENT DOCUMENTS

| | | | |
|---|---|---|---|
| 684,578 | 10/1901 | Merrill | 75/109 |
| 4,152,143 | 5/1979 | Kausel et al. | 75/109 |

Primary Examiner—R. Dean
Attorney, Agent, or Firm—Hill, Van Santen, Steadman, Chiara & Simpson

[57] ABSTRACT

A method for the cementation of a metal from a solution containing metallic ions by the addition of a finely divided cementation medium, wherein the cementation reaction is carried out in a reaction chamber located in an oscillating reactor which is at least partially filled with agitation bodies inert with respect to the reaction, the agitation bodies having a maximum dimension in the range from 2 to 150 mm and being sufficiently large to transmit the oscillations of the reactor into the reaction chamber, the specific gravity of the bodies being appreciably greater than the specific gravity of the solids in the reactor. The method is particularly applicable to the cementation of copper.

13 Claims, No Drawings

4,309,215

METHOD FOR THE CEMENTATION OF METALS

REFERENCE TO RELATED APPLICATION

This application is a continuation-in-part of our Ser. No. 018,018, filed Mar. 6, 1979, abandoned.

BACKGROUND OF THE INVENTION

1. FIELD OF THE INVENTION

This invention is in the field of cementation processes for precipitating metals from solution, particularly copper, by carrying out the cementation reaction in an oscillatory reactor at least partially filled with agitation bodies of controlled size to promote the progress of the reaction and to conduct it more efficiently.

2. DESCRIPTION OF THE PRIOR ART

Copper ores of the oxidized type can be reduced by hydrometallurgical processes in which the ore is leached without being concentrated, usually with dilute sulfuric acid. A solvent is employed which does not dissolve any silver or gold present. After leaching with the solvent, the resulting copper ions in solution may be precipitated by the addition of reactive metals into a form known as cement copper.

There is a widely developed method in hydrometallurgy for the cementation of metal from a leach solution utilizing a zinc precipitation. In this method, zinc dust or zinc powder is added as the cementation medium. The use of this type of process, however, in conjunction with solutions which may also contain cobalt, nickel, or other ions presents a difficulty because the reaction speed is very low. This results because of the production of an immunizing coating such as zinc sulfate on the substantial surface of the fine-grained cementation medium. In order to overcome this reduction of reaction rate, a substantial excess of zinc powder or zinc dust above the stoichiometric quantity can be introduced. In addition, a relatively low pH in the range of 4.2 to 4.5 may be maintained through continuous addition of acid. Finally, the charge may be agitated with a high energy agitation means.

There is a further disadvantage in this method in that a part of the zinc dust particles after formation of a sulfate coating, mixes with the cemented metal and is separated out with the metal in admixture. This contamination of the cemented metal requires additional expensive processing steps in order to recover the metal in substantially pure form.

Carrying out cementation processes in an oscillating container at least partially filled with pieces of a cementation medium is known, for example, from German Laid Open Specification No. 24 57 660 and U.S. Pat. No. 4,152,143. The precipitation medium consists of iron bodies such as iron scrap and/or iron granulate. The cementation medium is present in the form of bulky, solid bodies which act to transfer the shaking movements produced within the oscillating reactor because of their mass to the entire space within the reactor. There thus results a permanent abrasion process on the surfaces of the cementation medium which are thereby "activated" in that they are constantly being liberated from passivating metal coatings and because of this, the cementation reaction proceeds continuously with high electrochemical potential and therefore with the highest possible reaction velocity.

These circumstances do not occur in the case of cementation procedures from solutions using the addition of a fine-grained metallic cementation medium. It was found that the utilization of the oscillating reactor brings about no improvement in the reaction velocity, and that other difficulties such as the necessity of using large excesses of cementation media as well as the addition of acid are still necessary.

Merrill U.S. Pat. No. 684,578 describes the addition of pulverized silica, emery, corundum or the like to zinc to act as a precipitant for recovering precious metals from cyanide solutions. The function of the pulverized material is to keep the surfaces of the zinc particles mechanically clean, and thus avoid passivating layers on the zinc particles. These pulverized materials have the disadvantage that they mix with the cement material and are difficult to remove by conventional means after the refining process.

SUMMARY OF THE INVENTION

In accordance with the present invention, the cementation process is carried out in a reaction chamber located in an oscillating reactor which is at least partially filled with agitation bodies which are inert to the reaction, and have a maximum dimension in the range of 2 to 150 mm. This size range has been found particularly effective in carrying out the cementation reaction since the particles are not so fine as to be difficultly removable from the product, and yet are large enough to transmit the oscillations of the reactor into the reaction chamber. The continual addition of acid to provide control of the pH is also rendered unnecessary.

The present invention has the advantage that the shaking movements produced by the oscillatory reactor cooperate with the movement of the agitation bodies to achieve a constant "activation" of the surfaces of the fine-grained metal powder and at the same time, the entire liquid content of the reaction chamber is set into turbulent motion. Consequently, the fine particles of the cementation medium are constantly being impacted and the rubbing and impact stresses effectively prevent the buildup of passivating layers on their surfaces. In this manner, the electrochemical potential for the reaction mechanism is fully achieved and the cementation process proceeds with high velocity, without the necessity of adding acid and without the necessity of adding large excesses of the cementation medium. Moreover, a further advantage resides in the fact that the cement copper precipitator in accordance with the present invention is to a substantial extent free from contamination by means of zinc sulfate. All in all, therefore, the process of the present invention provides an optimal result which is improved qualitatively and quantitatively as compared with the state of the art.

DESCRIPTION OF THE PREFERRED EMBODIMENTS

The present invention makes use of agitation bodies which are inert with respect to the reactants, in that they do not participate in reacting with the materials or electrochemically in the cementation process. The size of the agitation bodies is of significant importance in properly carrying out the cementation reaction. At too fine a particle size, the bodies appear mixed with the product and are difficult to separate. At very large sizes, the agitation bodies are not completely effective in activating the surfaces of the fine-grained metal powder. Broadly speaking, the agitation bodies should have a maximum dimension in the range from 2 to 150 mm whereupon they are sufficiently large to transmit the oscillations of the reactor into the reaction chamber. More preferably, the agitation bodies have a maximum dimension in the range from 3 to 30 mm, and in the most preferred form of the invention, they have a maximum dimension in the range from 10 to 20 mm. The specific gravity of the agitation bodies should be appreciably greater than that of the solids in the reaction chamber.

In one embodiment of the present invention, the agitation bodies consist of an elastic, wear-resistant material preferably composed of natural rubber or a synthetic material elastomer. Under special operating conditions and requirements due to corrosion, temperature or abrasion, other materials can also be used. For example, the agitation bodies may consist of a ceramic material or they may consist of a solid, preferably a metal body with a coating of an elastic, wear-resistant, waterproof material over it.

In one alternative embodiment of the invention, the agitation bodies may consist of a metal which has the same or a higher electrochemical potential as the metal ions to be cemented. Thus, for example, in the precipitation of copper, granulated pieces of metallic copper can be utilized as the agitation bodies. This has the further advantage that a contamination of the cement metal with a foreign metal is prevented to the greatest extent.

In the use of the method of the present invention, the internal chamber of the oscillating reactor is advantageously filled to between 45 and 90% by volume with agitation bodies, and preferably between 60 and 75% by volume.

Under continuous operation, rendered possible by the utilization of an oscillating reactor, in the most efficient use of the process, a condition of equilibrium sets in whereby a predetermined production output can be obtained at the least specific energy requirements.

The process of the present invention, while it is applicable to many types of metals, is particularly applicable to the cementation of copper by means of zinc powder or zinc dust from a solution containing, in addition to copper ions, at least one further metal such as cadmium, arsenic, cobalt, nickel, mixtures of two or more of the foregoing, and the like.

One of the advantages of the present invention according to test results obtained in this connection is the fact that the cementation velocity proceeds more rapidly than under comparable conditions. With similar concentrations, similar cementation media and similar pH values, the reaction velocity may exceed conventional cementation velocities obtained in the prior art by a factor of 100 or so.

One of the advantages of the present invention is the fact that the zinc powder when added to a copper cementation bath may be added in approximately stoichiometric quantities. Broadly speaking, the zinc may be added in amounts slightly below stoichiometric (about 90% or so stoichiometric amounts) to about twice the stoichiometric amount.

Another advantage of the invention lies in the fact that the cementation is carried out preferably at pH values in the range of 5.2 to 5.5 so that normally additional acids need not be added during the cementation reaction.

The invention will be described in greater detail in connection with the following two examples.

Example I refers to a cementation procedure utilizing zinc treatment according to the state of the art in an agitator tank. Example II describes an example using the same starting materials and concentrations, but conducted in an oscillating reactor having a substantial amount of ceramic agitation bodies present.

EXAMPLE I

From a zinc leach solution there was precipitated the following cementates under the listed conditions.
Composition of leach solution:

| | |
|---|---|
| Zn | 150 g/l. |
| Cu | 400 mg/l. |
| Cd | 285 mg/l. |
| As | 35 mg/l. |
| Co | 11 mg/l. |
| Ni | 4 mg/l. |

Treatment temperature: 92° C.

| | |
|---|---|
| Additives (cementation accelerators): | $As_2O_3$ = 80 mg/l. |
| Precipitation medium: | Zn powder, 3.2 g/l. (corresponds to 7 times the stoichiometric quantity) |
| pH: | between 3.8 and 4.5, controlled through continuous addition of acid. |

Duration of precipitation: 60 minutes
Residual contents (average from 10 tests):

| | | |
|---|---|---|
| Cu | 0.18 | mg/l. |
| Co | 0.7 | mg/l. |
| Ni | 0.8 | mg/l. |

After cementing out the cadmium and arsenic in a second step at 80° C. with a precipitant of zinc dust in an amount of 1.0 grams per liter, there resulted a pure solution having a residual cadmium content of 0.65 mg/l and an arsenic content of 0.7 mg/l.

EXAMPLE II

The reaction was carried out in an oscillating reaction 70% filled with ceramic spheres having diameters of 18 millimeters, and a specific gravity of 2.6 kg/dm³. The following conditions were used:

| | |
|---|---|
| Oscillatory motion diameter | 8 mm. |
| Frequency | 16 Hz |
| Composition of leach solution | Same as Example I |
| Temperature | 92° C. |
| Additives | $As_2O_3$, 80 mg/l. |
| Precipitation medium | Zn powder, 1.1 g/l. (1.8 times the stoichiometric quantity) |
| pH value | 5.5 (no acid addition) |
| Time | 50 sec. |

Residual contents:

| | |
|---|---|
| Cu | 0.04 mg/l. |
| Co | 0.08 mg/l. |
| Cd | 0.05 mg/l. |
| Ni | 0.03 mg/l. |
| As | 0.05 mg/l. |

The differences between the two modes of operation can be set forth in tabular form as follows:

|  | I | II |
|---|---|---|
| Precipitation time | 3600 sec. | 55 sec. |
| Precipitant amount | 3.2 + 1.0 g/l. | 1.1 g/l. |
| Adapted to continuous operation | No | Yes |
| Energy use | 5 KW × 3600 sec. | 20 KW × 55 sec. |
| Acid use | 5 g/l. | 0 g/l. |
| Residual contents | Cu 0.18 | 0.04 mg/l. |
|  | Co 0.7 | 0.08 mg/l. |
|  | Cd 0.65 | 0.05 mg/l. |
|  | Ni 0.8 | 0.03 mg/l. |
|  | As 0.7 | 0.05 mg/l. |

The present invention is not limited to the described examples but the cementation principle may be utilized in connection with a broad variety of cementation procedures. Such procedures should be considered as coming within the scope of the present invention, as defined by the accompanying patent claims.

We claim as our invention:

1. In a method for the cementation of a metal from a solution containing metallic ions by the addition of a cementation medium, the improvement which comprises:

carrying out the cementation reaction in a reaction chamber located in an oscillating reactor which is at least partially filled with agitation bodies inert with respect to the reaction, said agitation bodies having a maximum dimension in the range from 2 to 150 mm and being sufficiently large to transmit the oscillations of the reactor into said reaction chamber, the specific gravity of said bodies being appreciably greater than the specific gravity of the solids in said reactor, said reaction being carried out for a time on the order of 55 seconds.

2. A method according to claim 1 in which said agitation bodies have a maximum dimension in the range from 3 to 30 mm.

3. A method according to claim 1 in which said agitation bodies have a maximum dimension in the range from 10 to 20 mm.

4. The method of claim 1 in which said agitation bodies consist of an elastic wear-resistant material composed of rubber or a synthetic elastomer.

5. The method of claim 1 in which said agitation bodies consist of a ceramic material.

6. The method of claim 1 in which said agitation bodies consist of a metal coated with an elastic, waterproof material.

7. The method of claim 1 in which said agitation bodies include a metal having an electrochemical potential at least as high as the metal ions to be precipitated.

8. The method of claim 1 in which the agitation bodies occupy from 45 to 90% by volume of the oscillation reaction chamber.

9. The method of claim 1 in which the agitation bodies occupy from 60 to 75% by volume of the oscillation reaction chamber.

10. A method according to claim 1 in which said metal is copper and said cementation medium is zinc powder.

11. A method according to claim 10 in which said solution contains, in addition to copper ions, at least one further metal selected from the group consisting of cadmium, arsenic, cobalt, nickel and mixtures thereof.

12. A method according to claim 10 in which the zinc powder is added in an amount of about 1.1 grams per liter.

13. A method according to claim 10 in which the cementation is carried out at a pH value in the range of 5.2 to 5.5.

* * * * *